P. F. Hodges.
Grain Drill.
N° 88,710. Patented Apr. 6, 1869.

Witnesses,
A. Ruppert
C. T. Clausen

Inventor,
P. F. Hodges
D. P. Holloway & Co
Attys

Sheet 2-2 Sheets.

P. F. Hodges.
Grain Drill.

N° 88,710. Patented Apr. 6, 1869.

Witnesses,
A. Ruppert.
C. T. Clausen.

Inventor
P. F. Hodges
D. P. Holloway & Co.
Attys

P. F. HODGES, OF ST. PAUL, MINNESOTA.

Letters Patent No. 88,710, dated April 6, 1869.

---

IMPROVEMENT IN GRAIN-DRILLS.

---

The Schedule referred to in these Letters Patent and making part of the same.

---

*To all whom it may concern:*

Be it known that I, P. F. HODGES, of St. Paul, in the county of Ramsey, and State of Minnesota, have invented a new and useful Improvement in Grain-Drills; and I do hereby declare that the following is a full, clear, and exact description of the same, reference being had to the annexed drawings, making part of this specification, in which—

Corresponding letters refer to corresponding parts in the several figures.

Figure 1:
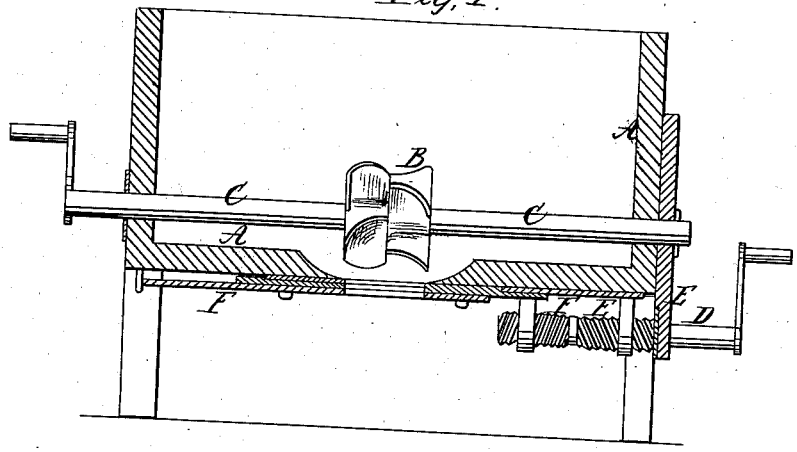
Figure 1 is a central sectional elevation of a seed-box for a grain-drill, showing my improved agitator, and the arrangement of slides for regulating the discharge-apertures.
Figure 2:
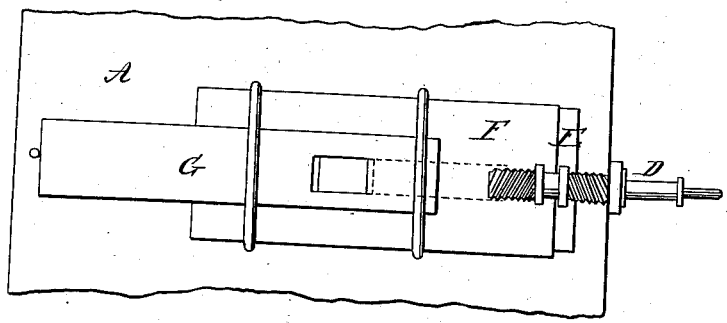
Figure 2 is a bottom view of the seed-box; also showing the regulating-slides, and the means of securing them in position.
Figure 3:
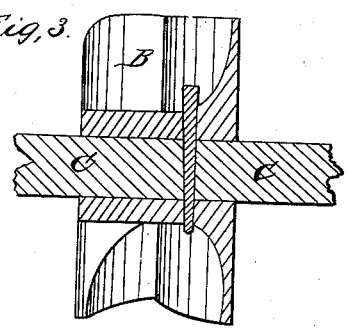
Figure 3 is a central sectional elevation of the agitator, showing a portion of the shaft to which it is attached, and the means of securing it thereto.
Figure 4:
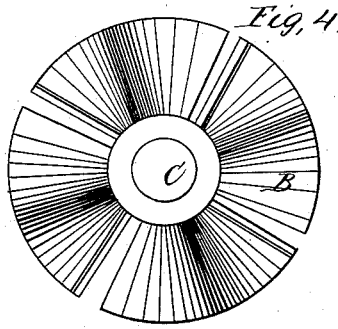
Figure 4 is an end view of the agitator.

This invention relates to that class of machines termed grain-drills; and

It consists in an improved agitator for the grain, by means of which such grain is to be taken from both sides thereof, and first carried to the centre of the discharge-aperture, and thus pressed down through such aperture in an even, unbroken stream.

The invention further consists in the construction and arrangement of the slides which regulate the area of the discharge-aperture, as will be more fully described hereafter.

A, in the drawings, represents a section of the seed-box, or grain-drill, which may be constructed as shown, or of any approved construction.

B represents my improved agitator, which may consist of two spiders, placed upon the shaft C, said spiders having arms projecting therefrom, which arms, or wings are in the form of segments of a circle, the curvature being such as to gather the grain from the sides of the disks, or spiders, and carry it toward the centre, and from that point press it downward through the grain-aperture.

I have described the agitator as being formed of two parts; but it is apparent that it may be made in one piece, and that the wings may be so arranged as that the termini of one near the centre of the one on the opposite side or end of the hub, so that, as the shaft is rotated, each wing will be gathering in the grain, and carrying it toward the discharge-aperture at different periods of time, as a consequence of which, the flow of grain from the discharge-aperture will be uninterrupted and steady, and no more grain will be discharged at one point in the line of travel of the machine than in another.

I would remark that the best-described form of construction is the one which I have illustrated, and that it is the one to which I give the preference.

D represents a screw-shaft, having, upon its outer end, a crank, or other suitable device for rotating it, it being supported in suitable bearings secured to the seed-box, or some other proper portion of the machine.

Upon that portion of this shaft which extends under the seed-box, there is formed a right-hand screw, for about one half of such distance, while upon the other half a left-hand screw is formed, the object of these screws being to move two slides, having discharge-apertures formed in them, in opposite directions, simultaneously, and by one movement of said screw.

E represents a slide, which may be made, of sheet-metal, of the required width and length to cover the apertures formed in the bottom of the seed-box.

Upon that end of this plate which is nearest the screw D, there should be attached a projection, which will serve as a nut for the screw to pass through, it being bored and tapped out for that purpose.

Figure 5:
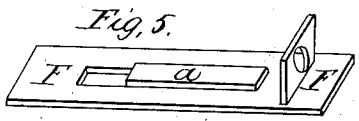
Figure 5 is a perspective view of the upper side of the slide F.

This plate is also to have a slot cut in it at the point where it comes under the discharge-aperture in the seed-box, which slot is to be of sufficient length to receive the projection a, formed upon plate F, as shown in fig. 5, and is to traverse said slot for the required distance, and also to form the discharge-aperture for the grain, so that, as the screw D is turned, the slide F will be moved in one direction, while the slide E will, by the same movement of the screw, be moved in the opposite direction, and thus a gradually-diminishing aperture will be made from the point of the beginning of the motion of said screw until such aperture is entirely closed, the centre of such aperture, whether large or small, always being under the centre of the agitator.

F represents the outer slide, above referred to, which is to be placed upon the under surface of E, and is to have a projection similar in all respects to that described as being placed upon the upper slide, and for the same purpose.

Upon the central portion of this slide, there is formed a projection, a, which moves within the slot in plate F, and serves as a guide for the movements of both plates.

G represents a slide, which may be made of sheet-metal, or of any other suitable material, and placed under or outside of the slides E and F, there being a slot cut in it, to permit the grain to pass through, it being so arranged that it may, when in the proper position, close the discharge-aperture entirely, and thus prevent the passage of any grain, even though the other slides should be in a position to permit the grain to pass them.

Having thus described my invention,

What I claim, and desire to secure by Letters Patent, is—

1. The agitator B, constructed and to operate substantially in the manner described.

2. In combination with the described agitator B, the within-described arrangement of slides E and F, substantially as shown and described.

3. The slides E, F, and G, when constructed as shown, and arranged to operate in connection with screw D, substantially in the manner set forth.

In testimony whereof, I have signed my name to this specification, in the presence of two subscribing witnesses.

P. F. HODGES.

Witnesses:
 DANIEL ROHRER,
 R. L. WHARTON.